United States Patent [19]
Wilson

[11] 3,887,990
[45] June 10, 1975

[54] METHOD OF SECURING TWO MEMBERS TOGETHER WITH A FASTENER

[76] Inventor: Floyd Leroy Wilson, P. O. Box 203, Manhattan, Kans. 66502

[22] Filed: Dec. 11, 1972

[21] Appl. No.: 313,619

[52] U.S. Cl. .................... 29/450; 29/525; 29/526; 85/36; 52/758 F; 151/19 R
[51] Int. Cl. ... B23p 11/02; B23p 19/00; B23p 19/02
[58] Field of Search ............. 151/19 R; 85/5, 7, 36, 85/33; 29/526, 427, 516, 525, 451, 450; 52/758 F

[56] References Cited
UNITED STATES PATENTS

| | | | |
|---|---|---|---|
| 496,847 | 5/1893 | Berry | 151/19 R |
| 1,775,055 | 9/1930 | Tarbox et al. | 29/525 X |
| 2,699,589 | 1/1955 | Redell | 151/19 R UX |
| 3,238,986 | 3/1966 | Butler | 151/19 R |
| 3,572,779 | 3/1971 | Dawson | 29/516 X |

Primary Examiner—Charlie T. Moon
Attorney, Agent, or Firm—Burns, Doane, Swecker & Mathis

[57] ABSTRACT

A fastener including a knurled stud inserted into a tapered and slit nut insert with a jam nut forced thereon for compressing the tapered nut insert into locking engagement with a knurled portion of the stud. The tapered nut insert may be provided with a knurled inner surface which coacts with the knurled stud to provide locking engagement therebetween, preventing relative movement, both rotational and axial. Both the jam nut and the tapered nut insert are shown to have helical buttressed threads to lock the jam nut in place against separating axial movement once the jam nut has been forced over the tapered nut insert and to allow disassembly through rotation of the jam nut.

5 Claims, 5 Drawing Figures

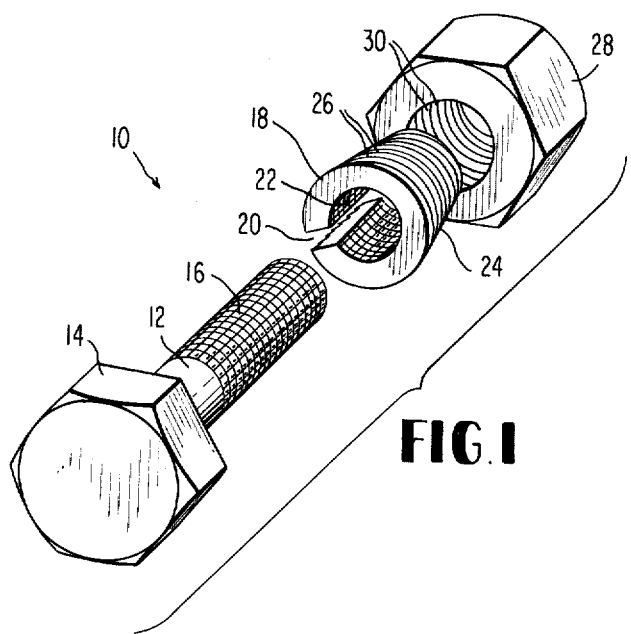
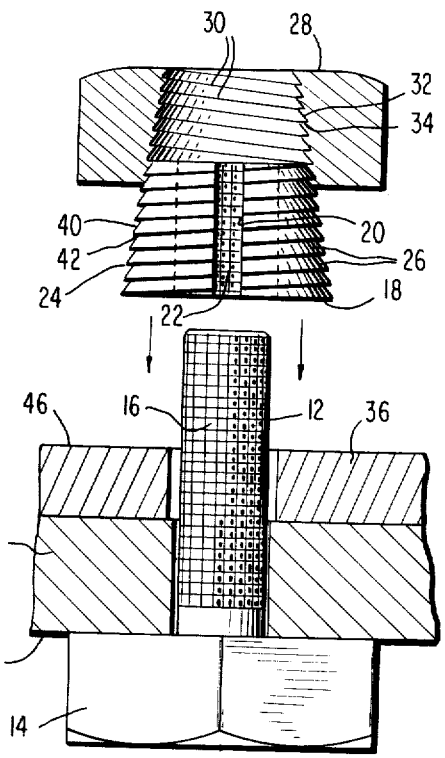
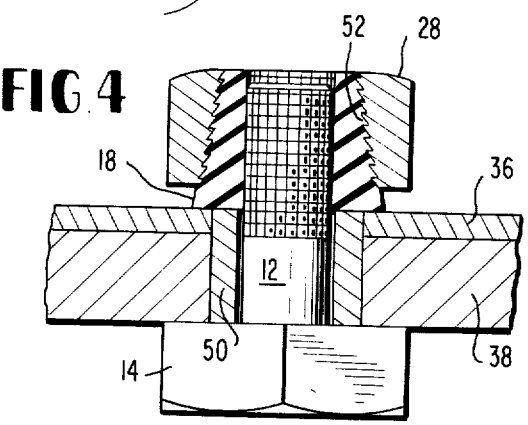
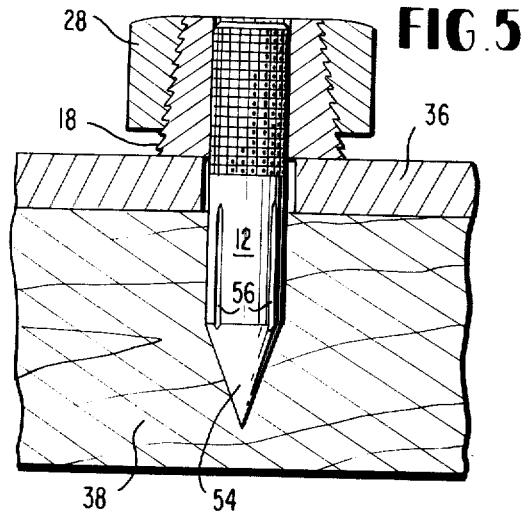
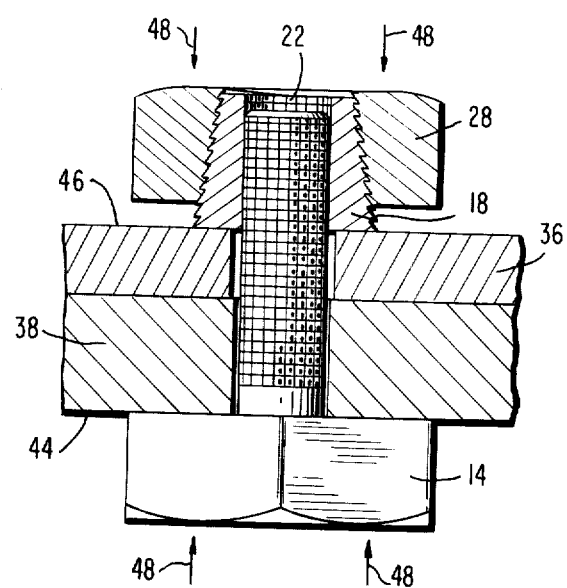

METHOD OF SECURING TWO MEMBERS TOGETHER WITH A FASTENER

BACKGROUND OF THE INVENTION

This invention relates to a method and apparatus for joining or fastening two or more members and more particularly to a threepiece fastener comprising a stud, a split tapered nut insert, and a jam nut, which is assembled by an axial force and disassembled by rotation.

Three-piece prior art fasteners which utilize a stud, a split tapered nut insert, and a jam nut are generally characterized in that the stud, the tapered nut insert, and the jam nut are all threaded. This type of arrangement is shown in U.S. Pat. Nos. 854,471 and 1,524,099. To assemble the fasteners of this type, the tapered nut insert is usually rotated onto the stud, and then the lock nut rotated onto the tapered nut insert to clamp the tapered nut insert to the bolt. This manner of assembly is not only time consuming in that rotation of the various parts is required, but is also not readily applicable to mass production techniques in which thousands of fasteners are to be assembled in a simple and rapid manner.

It is an object of the present invention to provide an improved fastener which can be locked by a simple axial blow and disassembled by relative rotation of one of the parts.

A further object is to provide a novel three-piece member where the stud has a surface portion that is roughened such as by being knurled, a split nut insert which has an inner surface that is also roughened and sufficiently large to slide easily over the roughened stud portion, and a jam nut which fits over the nut insert and is so shaped as to compress the nut insert roughened portion against the stud roughened portion. The jam nut preferably has an inner buttressed thread which allows it to be axially forced on the nut insert and locked against reverse axial movement. By making the buttressed thread helical, the jam nut can be removed by relative rotation.

It is yet another object to provide a novel nut insert which has outer tapered walls and which may contain mating buttressed threads.

These and other objects will become more fully apparent from the claims and from the description as read in conjunction with the appended drawings.

BRIEF DESCRIPTION OF THE DRAWINGS

FIG. 1 is an exploded view of the fastener of the present invention;

FIG. 2 is an elevation in partial section of the fastener of FIG. 1 prior to the joining of the nut insert and jam nut on the stud;

FIG. 3 is an elevation in partial section showing the assembled fastener of FIG. 1;

FIG. 4 is an elevation in partial section showing an alternative embodiment of the fastner of FIG. 1, including an annular sleeve and a deformable tapered nut insert; and FIG. 5 is an elevation in partial section of a further embodiment of the subject fastener in which one end of the stud portion of the fastener is pointed and splined.

DETAILED DESCRIPTION

Referring now to FIGS. 1–3 of the drawings, the fastener 10 according to the invention is shown to include a stud 12 having a head 14 at one end and a shank provided with an outer surface portion 16 that has been roughened as by knurling. The roughened or serrated surface is preferably provided with raised points or protuberances of material.

A tapered nut insert 18 is split axially to have a slot 20. The nut insert 18 also has an internal surface portion 22 that either has been roughened similarly to the stud portion 16 or is smooth but compressible to become roughened after assembly. The inner diameter is slightly larger than the outer diameter of the stud portion 16 so that nut insert 18 may be easily slipped over the end of stud 12. The width of slot 20 is sufficiently large so that when the nut insert 18 is compressed, the roughened surface portion 22 of the insert frictionally engages the roughened surface portion 16 of the stud 12 so that relative movement, both axially and rotationally, is prevented.

A jam nut 28 fits over the outside of insert 18 and is driven axially as by a hammer blow to compress the nut insert 18 about the stud 12. Either the inner surface of nut 28 or the outer surface of nut insert 18, or both, are tapered, as illustrated. The amount of taper should be sufficient to cause good frictional engagement between the nut insert 18 and stud 12. On the inner surface of jam nut 28 are threads 30 which are buttressed to allow the jam nut to be driven on insert 18 but which resist axial movement in the opposite direction.

The stud 12 and jam nut 28 may be made of any metal or any suitable material conventionally used for fastening two members together. The nut insert 18 may be made of a deformable, and preferably resilient, material, such as metal or a compressible synthetic resin material such as nylon.

In the embodiment of FIGS. 1–3, the nut insert 18 is shown to have mating buttressed threads on the outer tapered surface 24. By having threads on both the jam nut 28 and nut insert 18, the depth of the threads on each member can be made reasonably small and the desired result accomplished.

In applications where it is desired that the fastener be capable of non-destructive disassembly, the buttressed threads are made helical as illustrated so that by relative rotational motion between jam nut 28 and nut insert 18, the jam nut can be removed.

Referring now to FIG. 2, the jam nut 28 is illustrated as having buttressed threads 30 which have sloped portions 32 and portions 34 which are at substantially right angles to the stud axis. The sloped portions 32 act as camming surfaces for compressing the tapered nut insert 18 around the horizontal portion of the shank that extends through and above the two members 36 and 38 that are to be fastened together.

When buttressed threads 24 are also provided on the exterior surface 24 of the tapered nut insert 18, these threads have corresponding sloped portions 40 and portions 42 at substantially right angles to the stud axis. The sloped portions 40 serve as cam followers for the sloped portions 32 of the threads 30 of the jam nut. It will be seen that the horizontal portions 34 and 42 coact to lock the jam nut 28 onto the tapered nut insert 18 after the jam nut 28 has been forced thereon.

In operation, the stud 12 may be passed through the apertures in members 36 and 38 such that a surface of the head 14 abuts one side 44 of the members to be joined. Prior to assembly, the jam nut 28 may be rotated onto, or otherwise engaged with, the small end of the tapered nut insert 18 to form an insert-nut assembly. The insertnut assembly may then be slipped over the roughened portion 16 of the stud 12 extending above a surface 46 of the members to be joined.

As illustrated in FIG. 3, the larger end of the tapered nut insert 18 may abut the surface 46 such that the members 36 and 38 are joined together. After the slipping of the insert-nut assembly onto the exposed stud portion, a compressive force such as illustrated by the arrows 48 may be applied in an axial direction such that the nut insert 18 is compressed around the stud 12. Upon compression, the serrated surface 16 of the stud 12 coacts with the interior surface 22 to provide a locking engagement of the tapered nut insert 18 to the stud 12.

When it is desired to disassemble the fastener thus formed, all that is necessary is to rotate the jam nut 28 for its removal from the tapered nut insert 18. If nut insert 18 is of a resilient material, it will open to become free of the stud 12.

Referring now to FIG. 4, in which like elements carry like numerals, the stud 12 is shown to have a rigid annular sleeve 50 which surrounds that portion of the stud 12 passing through the members 36 and 38. The purpose of the annular sleeve 50 is to prevent deformation of the members 36 or 38 when an axially compressive force is applied to the fastener.

As illustrated in FIG. 4, the tapered nut insert 18 may be provided with a smooth exterior and may be of a compressible synthetic resin material such as nylon, so that when the jam nut 28 is forced thereon, the interior surface, which may initially be smooth, will frictionally engage the roughened surface 16 of stud 12 and threads 52 will be formed on the initially smooth exterior surface. In this sense, the tapered nut insert 18 may be self-threading upon the application of an axially compressive force to the fastener. Removal of the jam nut 28 from the tapered nut insert 18 may be accomplished by rotation as described in connection with FIGS. 2 and 3.

Referring to FIG. 5, depending on the constituency of one of the members to be joined, the stud 12 may be provided with a pointed end and splines 56 such that the stud 12 may be driven into one of the members and restrained against rotation. The tapered nut insert 18 and the jam nut 28 may thereafter be assembled onto an exposed portion of the stud. This embodiment is particularly useful when member 38 is wood.

It will be appreciated that in all of the aforementioned embodiments, the axial compressive force may be provided by a hammer blow with the bottom portion of the stud resting on a stationary platen. Thus, with one blow, the insert-nut assembly may be slipped over a portion of the stud and secured thereto. Therefore, the assembly of the aforementioned fastener may be accomplished easily and quickly. A convenient method of disassembly is provided by the rotation and removal of the jam nut. In addition, if a deformable tapered nut insert is utilized, the tapered nut insert may be threaded simultaneously with the hammer blow so that this function is also accommodated in a one-step assembly procedure.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and intended to be covered by Letters Patent is:

1. A method for securing a first apertured member to a second apertured member comprising the steps of:
    inserting through the apertures in said members a stud having a head at one end, and an exposed portion having a roughened outer surface which extends beyond said members;
    sliding a nut insert having an annular inner surface over the exposed stud portion with one end thereof in abutment with the outer surface of the first member, the insert having a longitudinal slot and being formed of a deformable material;
    providing a jam nut having buttressed internal threads, there being a relative taper between the exterior wall of said insert and the internal threads of said jam nut;
    driving said jam nut over the exterior walls of the nut insert with an axially directed compressive impact sufficient to reduce the width of said slot thereby causing frictional engagement of the roughened surface of said stud and the interior surface of said nut insert sufficient to prevent either axial or rotational relative movement between the insert and the stud, said jam nut axial force being also sufficient to cause the threads of the jam nut and the exterior wall of the nut insert to be locked together to prevent direct axial separation of the jam nut and nut insert.

2. The method of claim 1 wherein the buttressed threads are helical, and said jam nut and nut insert are separable by rotating the jam nut relative to the nut insert.

3. A method of releasably fastening two members together by providing a stud located to extend through the members and having an exposed serrated portion;
    providing a nut and insert assembly, the insert having an interior opening sufficiently large to freely slide over the serrated portion of said stud and having an outer surface which is tapered relatively to the walls of the inner surface of said nut the surface of the interior opening of the nut being threaded;
    slipping said insert-nut assembly over the serrated portion of said stud; and
    applying an axially directed compressive impact between one end of the stud and the insert-nut assembly thereby to compress the interior surface of the insert into locking engagement with the serrated portion of the stud while advancing the nut along the outer surface of the insert with the nut being locked to the insert outer surface to prevent relative axial movement by coacting threads after application of the compressive force except through rotation of said nut relative to said insert.

4. The method of claim 3 wherein the exterior surface of the insert and the interior surface of the nut are formed with buttress threads having sloping surfaces which cam the nut insert into a compressive condition to surround the serrated portion of said nut.

5. The method of claim 4 wherein the insert is split axially to have a longitudinal slot and the method further comprises the step of reducing the distance between facing edges of said slot by application of said compressive force.

* * * * *